United States Patent
Chan

(10) Patent No.: US 7,103,391 B2
(45) Date of Patent: Sep. 5, 2006

(54) METHOD AND SYSTEM FOR PLAYING AN AUDIBLE ALERT

(75) Inventor: Choong Cheng Chan, Singapore (SG)

(73) Assignee: Motorola, Inc., Schaumburg, IL (US)

(*) Notice: Subject to any disclaimer, the term of this patent is extended or adjusted under 35 U.S.C. 154(b) by 11 days.

(21) Appl. No.: 10/960,456

(22) Filed: Oct. 7, 2004

(65) Prior Publication Data

US 2006/0079295 A1 Apr. 13, 2006

(51) Int. Cl.
*H04B 1/38* (2006.01)
(52) U.S. Cl. .................. 455/567; 455/3.06; 455/566
(58) Field of Classification Search ............... 455/567, 455/566, 3.06, 412.1–2, 414.4, 414.1; 84/609
See application file for complete search history.

(56) References Cited

U.S. PATENT DOCUMENTS

2002/0035914 A1* 3/2002 Togashi ................. 84/609
2003/0054864 A1* 3/2003 Mergler ................. 455/566

* cited by examiner

*Primary Examiner*—Edward F. Urban
*Assistant Examiner*—Tu X. Nguyen
(74) *Attorney, Agent, or Firm*—Randall S. Vaas

(57) ABSTRACT

A method (900) and system in the form of a telephone (100) for defining and playing on the radio telephone a user defined audible alert or ring tone enables creative selection of portions of digital music files. The method (900) includes receiving (905) an incoming communication signal for communicating with a user of a radio telephone (100). Next, the method (900) provides for identifying (910) a pre-selected music file, the music file being pre-selected by the user from a plurality of music files stored on the telephone (100) to provide the audible alert in response to the receiving. The audible alert is the played (915) in which the audible alert comprises a pre-defined portion of the pre-selected music file thereby informing the user to the incoming communication signal, the portion of the music file being defined by a first stop point in the music file.

16 Claims, 4 Drawing Sheets

METHOD AND SYSTEM FOR PLAYING AN AUDIBLE ALERT

FIELD OF THE INVENTION

The present invention relates generally to a method and system for playing an audible alert on a radio telephone, and in particular to playing a ring tone that comprises a pre-defined portion of a digital music file.

BACKGROUND OF THE INVENTION

Since the advent of the telephone in the early twentieth century, users have been alerted to the presence of an incoming call usually by a ring sound. Early telephones incorporated a mechanical bell into a telephone housing. An incoming call then triggered an electrical solenoid that actuated the bell. More recently, telephones have incorporated electronic ringing devices that output a ring sound through a speaker. Most telephones still use a traditional ring pattern however consisting of a series of brief, staccato monotone sounds interrupted by approximately equal periods of silence.

The mobile telephone was first introduced in 1946, but gained wide commercial acceptance only in the 1990's. Today, consumers increasingly use wireless service as their sole telephone access method. The recent rapid growth of wireless telephone use was accompanied by many related innovations including SMS messaging and digital wireless internet access through mobile telephones. Another innovation was a change away from the standard monotone telephone ring to various diverse ring tones including music and other electronic sounds.

Mobile telephones now offer users the option of selecting their own ring tones. Often these tones are selectable from a menu on the telephone and include a list of preprogrammed sounds provided by the manufacturer. Further, digital wireless telephones allow users to download segments of music that can be played as ring tones. Such music segments are referred to as polyphonic ring tones. Users can then Polyphonic ring tones have thus become big business for music companies, as mobile telephone subscribers now pay billions of dollars a year to download dedicated polyphonic ring tone music files from network servers to mobile telephones. Subscribers value the ability to download musical ring tones from a wide list of music options as a method for personalizing their telephones.

SUMMARY OF THE INVENTION

According to one aspect, the present invention is therefore an improved method of playing an audible alert or ring tone on a radio telephone. The method includes the steps of receiving an incoming communication signal for communicating with a user of the radio telephone, and then identifying at least one pre-selected music file. The music file is pre-selected by the user from a plurality of music files stored on the telephone. The audible alert is then played that includes a pre-defined portion of the pre-selected music file, thereby informing the user to the incoming communication signal. The portion of the pre-selected music file is defined by a first stop point in the music file.

According to another aspect, the present invention is a radio telephone system capable of playing a user selected audible alert or ring tone. The telephone system includes a radio frequency communications unit, a memory, a speaker and a micro-processor operatively connected to the communications unit, the memory and the speaker. The memory includes at least one pre-selected music file. The telephone system is adapted to receive an incoming communication signal for communicating with a user of the radio telephone and to identify the at least one pre-selected music file. The music file is pre-selected by the user from a plurality of music files stored on the telephone to provide the audible alert in response to the received signal. The audible alert is then played on the telephone over the speaker and includes a pre-defined portion of the pre-selected music file, thereby informing the user to the incoming communication signal. The portion of the pre-selected music file is defined by a first stop point in the music file

BRIEF DESCRIPTION OF THE DRAWINGS

In order that the invention may be readily understood and put into practical effect, reference will now be made to a preferred embodiment as illustrated with reference to the accompanying drawings, wherein like reference numbers refer to like elements, in which.

DETAILED DESCRIPTION OF THE PREFERRED EMBODIMENT OF THE INVENTION

Figure 1:
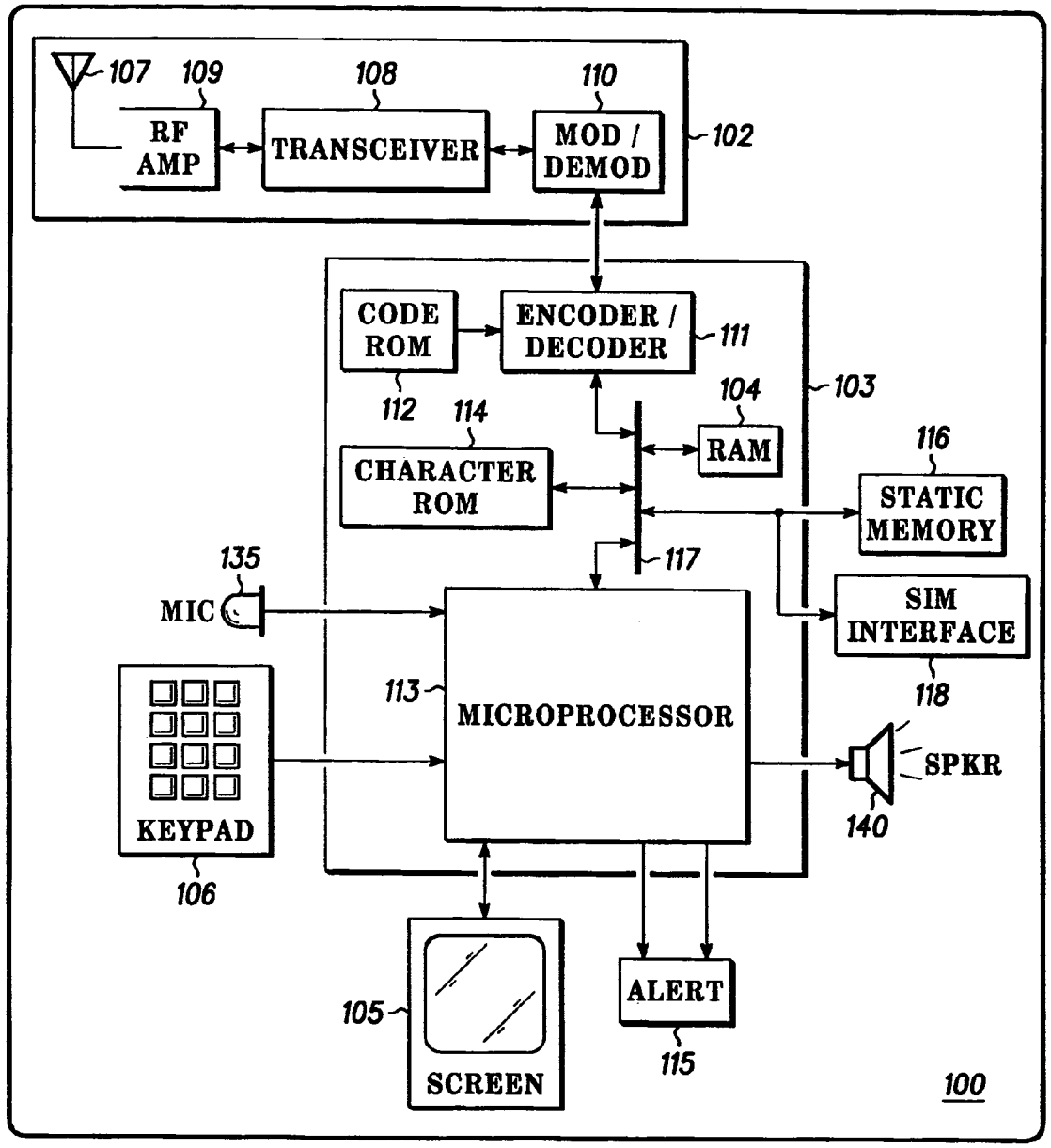
FIG. 1 is a schematic diagram illustrating a radio telephone according to one embodiment of the present invention.

With reference to FIG. 1, there is a schematic diagram illustrating a system forming a radio communications device, specifically a radio telephone 100, comprising a radio frequency communications unit 102 coupled to be in communication with a processor 103. The radio telephone 100 also has a keypad 106 and a display screen 105 coupled to be in communication with the processor 103. As will be apparent to a person skilled in the art, screen 105 may be a touch screen thereby making the keypad 106 optional.

The processor 103 includes an encoder/decoder 111 with an associated code Read Only Memory (ROM) 112 storing data for encoding and decoding voice or other signals that may be transmitted or received by the radio telephone 100. The processor 103 also includes a micro-processor 113 coupled, by a common data and address bus 117, to the encoder/decoder 111, a character Read Only Memory (ROM) 114, a Random Access Memory (RAM) 104, static programmable memory 116 and a SIM interface 118. The static programmable memory 116 and a SIM (often called a SIM card) operatively coupled to the SIM interface 118 each can store, amongst other things, selected incoming text messages and a Telephone Number Database TND (phonebook) comprising a number field for telephone numbers and a name field for identifiers associated with one of the numbers in the name field. For instance, one entry in the Telephone Number Database TND may be 91999111111 (entered in the number field) with an associated identifier "Steven. C! at work" in the name field. The SIM card and static memory 116 may also store passwords for allowing accessibility to password protected functions on the radio telephone 100.

The micro-processor 113 has ports for coupling to the keypad 106 screen 105 and an alert 115 that typically contains an alert speaker, vibrator motor and associated drivers. Also, micro-processor 113 has ports for coupling to a microphone 135 and communications speaker 140. The character Read only memory 114 stores code for decoding or encoding text messages that may be received by the communications unit 102. In this embodiment the character Read Only Memory 114 also stores operating code (OC) for micro-processor 113 and code for performing functions associated with the radio telephone 100.

The radio frequency communications unit 102 is a combined receiver and transmitter having a common antenna 107. The communications unit 102 has a transceiver 108 coupled to antenna 107 via a radio frequency amplifier 109. The transceiver 108 is also coupled to a combined modulator/demodulator 110 that couples the communications unit 102 to the processor 103.

In a preferred embodiment, the present invention is a method of playing an audible alert on the radio telephone 100 where the audible alert consists of a music segment selected by a user. In another preferred embodiment, the present invention is the radio telephone 100 adapted to play an audible alert consisting of a music segment selected by a user.

Users of digital radio telephones 100 often use their phones 100 to download music files for listening pleasure. The present invention thus enables a single music file to be used both for listening pleasure and as an audible alert or ring tone. Memory space on radio telephones 100 is frequently limited, so the ability to use a single music file for both listening enjoyment and as a ring tone is useful. Also, the prior art process of downloading music files dedicated for use only as polyphonic ring tones may be slow and inconvenient. Pre-defining user-selected rings tones according to the present invention therefore adds convenience while also adding flexibility. Users are able to select exact desired portions of music files, not just portions that are pre-selected by a music company or subscriber network.

Figure 2:
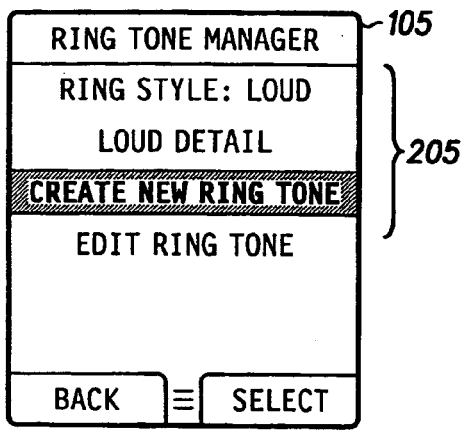
FIGS. 2–6 are schematic diagrams illustrating various content on a display screen of a radio telephone according to one embodiment of the present invention.

Referring to FIGS. 2–6 there are schematic diagrams illustrating various content on the display screen 105 of the radio telephone 100 according to one embodiment of the present invention. For example, FIG. 2 illustrates menu options 205 on a ring tone manager screen. One of the menu options 205 is "Create Ring Tone". When a user selects "Create Ring Tone", a second screen shown in FIG. 3 appears on the display screen 105. The second screen enables a user to select a specific file 310, such as a song like "Hey Jude".

Figure 4:
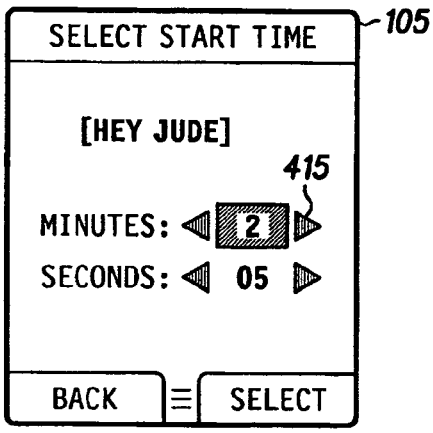
Figure 5:
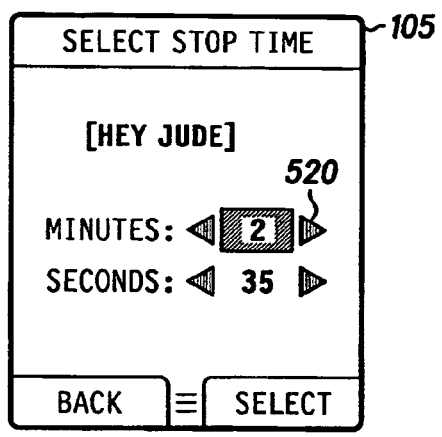

Next, a third screen shown in FIG. 4 appears on the display screen 105. The third screen enables a user to enter a start point 415 relative to the beginning of the selected file 310. For example, if a user enters 1:15, a ring tone will be programmed to begin at one minute, 15 seconds into the play time of the selected file 310 such as the song "Hey Jude". Similarly, a fourth screen shown in FIG. 5 next appears on the display screen 105 and enables a user to enter a stop point 520 for a ring tone.

Figure 6:
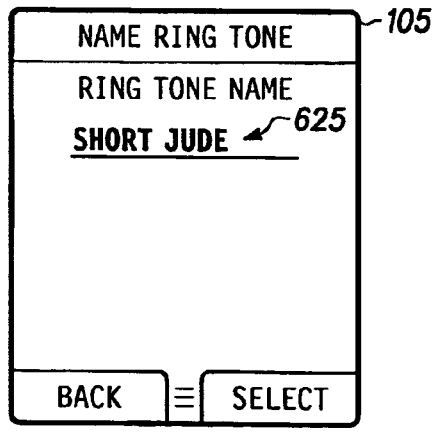

Finally, a fifth screen shown in FIG. 6 may appear that enables a user to enter a name 625 of the selected ring tone file. The user may thus enter for example a mnemonic name 625 such as "Short Jude".

Figure 7:
FIG. 7 is a schematic diagram illustrating an example of a ring tone file format according to an embodiment of the present invention.

Referring to FIG. 7, there is a schematic diagram illustrating an example of a ring tone file format 700 according to an embodiment of the present invention. The format 700 includes a file location 705 on the phone 100, a ring tone name 625, a playback start point 415, and a playback stop point 520.

Because the file format 700 shown in FIG. 7 includes only pointers to a music file location and file start and stop points 415, 520, and does not include actual digital music data, the format 700 requires a relatively small amount of memory. That leverages the use of music files that may be already stored on the phone 100 for listening pleasure. Further, music files that a user would store on a phone 100 for listening pleasure are likely to be of the same musical genre and style that the same user would prefer as ring tones. So the method and system of the present invention enables a dual use of music files stored on radio telephones 100, which dual use is memory efficient and very convenient for users. The music files 310 and the file formats 700 may be stored on the phone 100 in any of various memory locations such as in the RAM 104, the static memory 116 or on a SIM card.

Figure 8:
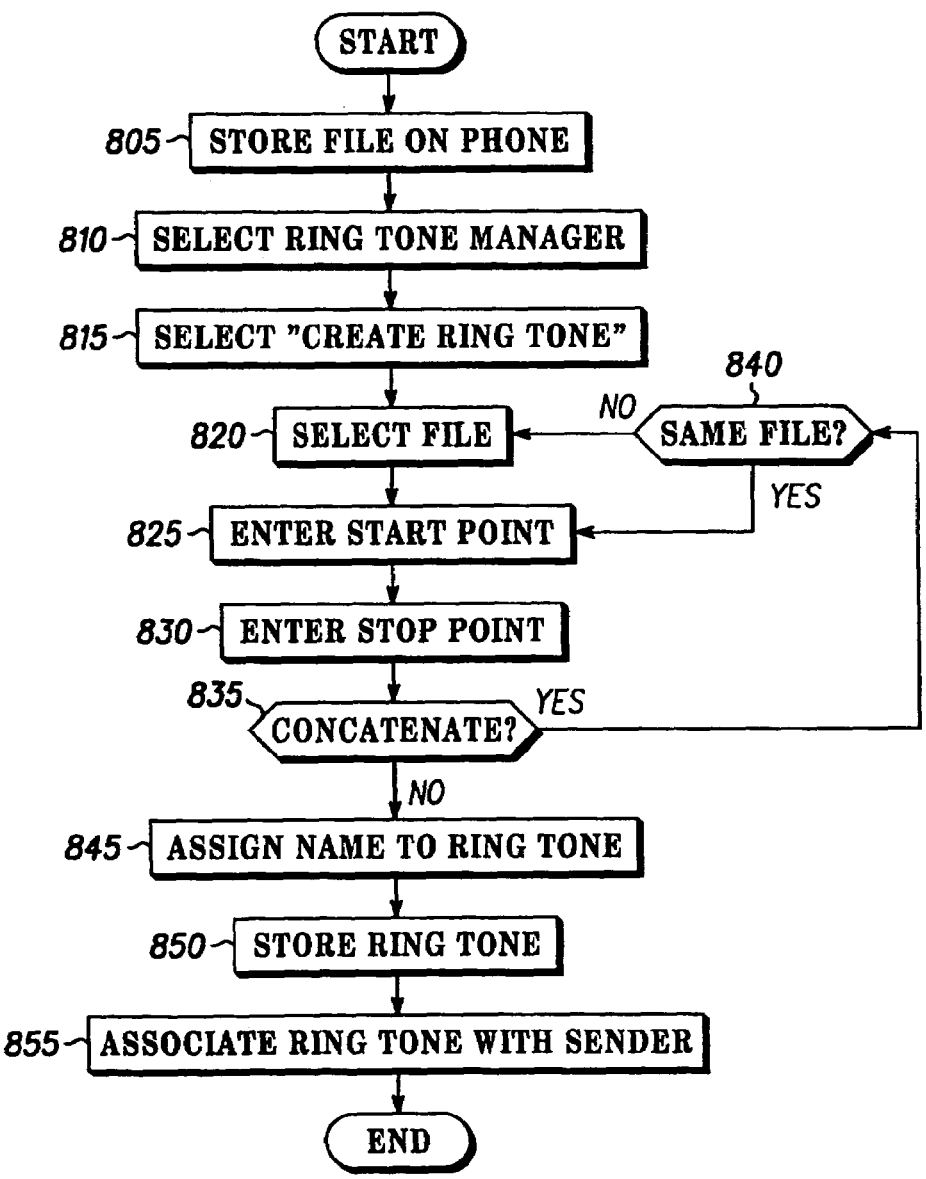
FIG. 8 is a generalized flow diagram illustrating a method of pre-defining a ring tone according to an embodiment of the present invention.

Referring now to FIG. 8, there is a generalized flow diagram illustrating a method 800 of pre-defining a ring tone according to an embodiment of the present invention. First, at step 805 a music file is stored on the phone 100. Step 805 may be completed in various ways such as by a distributor of radio telephones that pre-loads the phone 100 with selected music files before selling the phone 100 to an end user. Also, end users may download their own desired music files to the phone 100. Such downloading may be through wired or wireless connections to the Internet or through wired or wireless connections to a user's other personal device, for example through a connection to a user's personal computer or digital music player. After a music file is stored on the phone 100, a user is able to conveniently access the file for his or her own listening pleasure. Also, depending on any applicable copyright laws, the user may also conveniently transfer the stored music file to other phones 100 or devices owned by friends and acquaintances.

Next, at step 810, the method 800 continues when a user decides to pre-define a portion of a locally stored music file as an audible alert or ring tone for the phone 100. Here, the user selects a ring tone manager feature from the display screen 105 on the phone 100, which may then display a menu such as that illustrated in FIG. 2. At step 815, the user then selects a "Create Ring Tone" option 205, which displays a list of files 310, such as the list shown in FIG. 3, available for use as ring tones.

Figure 3:
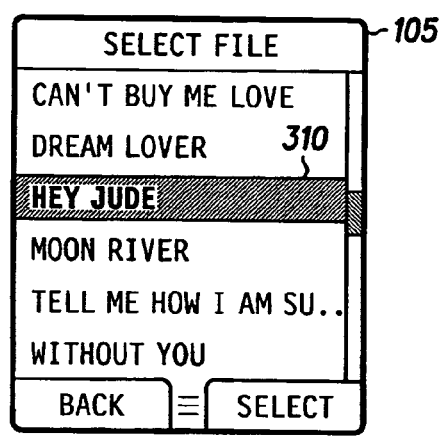

At step 820 a user then selects a specific music file 310 or other digital sound file 310 for use in a new ring tone. A selected file 310 may be a specific song such as "Hey Jude" as shown in FIG. 3. Next, at steps 825 and 830, the user enters the start point 415 and stop point 520 that define the portion of the selected file 310 that the user seeks to define as an audible alert. If the user selects only a stop point 520, the phone 100 may be programmed to assume that the start point 415 is the beginning of the selected file 310. Thus in that circumstance the defined portion of the selected file 310 would consist of the start of the file 310 up until the stop point 520.

The start point 415 and the stop point 520 may be defined as a time relative to the start of a selected file 310, or as any other point that indicates a position in the file 310, such as a track or memory location.

After a first portion of a selected file 310 is defined, the method 800 continues at step 835 where a user decides whether to concatenate the first defined portion of the selected file 310 with another portion of a file 310. If the user decides to concatenate then the method 800 continues at step 840 where the user decides whether to concatenate another portion of the same file 310 or a portion of a different file 310. If the user wants to concatenate a portion from a different file 310 then the method 800 returns to step 820 where the user selects an additional file 310. Otherwise the method 800 returns to step 825 where the user enters another start point 415, and then to step 830 where the user enters another stop point 520.

At step 835, when a user decides not to concatenate multiple portions of files 310, or has completed the process of defining multiple portions of files 310 for concatenation, the method continues to step 845 where a user assigns a name 625 to the defined ring tone. At step 850 the defined ring tone is stored on the phone 100 using the file format 700. The file format 700 may be extended to include multiple file locations 705 and multiple start points 415 and stop points 520 when a user has defined numerous portions of files 310 to be concatenated in a single ring tone.

Finally, at step 855, the user may associate the newly defined and stored ring tone file with one or more callers or senders of the communication. Thus for example when a user's family members call the phone 100, it may be programmed to sound an audible alert consisting of one ring tone; whereas when the user's friends call the phone 100, it may be programmed to sound an audible alert consisting of a second ring tone. A unique ring tone consisting of a pre-defined portion of a music file 310 may also be associated with a specific individual caller.

Similarly, the concatenation feature of the present invention may be used to categorize callers using progressively narrower genus and species designations. For example, a first portion of a first song may be played at the start of a ring tone to indicate that a call or communication is received from a user's workplace. A second portion of another song may then be concatenated with the first portion and used to identify a particular individual caller from the workplace. A user of the phone 100 thus is able to readily and systematically identify individual callers.

Figure 9:
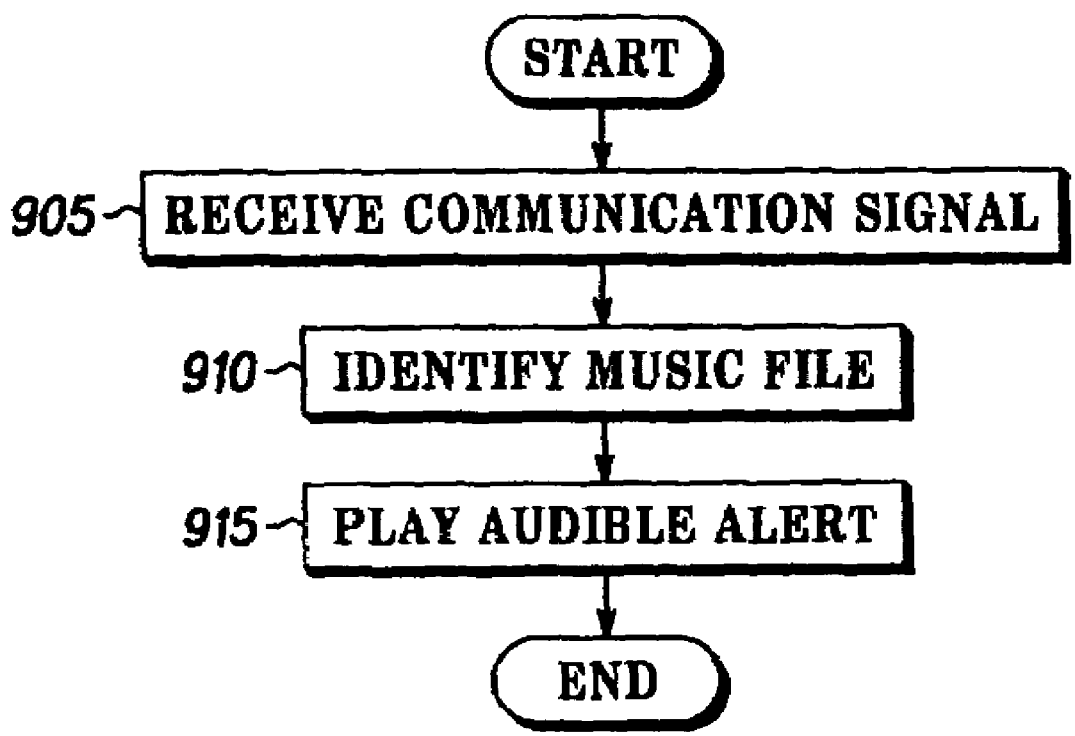
FIG. 9 is a generalized flow diagram illustrating a method according to the present invention that is employed when a communication is received on a radio telephone.

Referring to FIG. 9, there is a generalized flow diagram illustrating a method 900 according to the present invention that is employed when a communication is received on a radio telephone 100. First, at step 905 the incoming communication signal is received. Next, at step 910, the phone 100 identifies at least one pre-selected music file 310 for use in sounding an audible alert. According to the process 800 described above, a pre-defined portion of a pre-selected music file 310 may be associated with the sender of the incoming communication signal. Finally, at step 915, the phone 100 plays an audible alert including the identified portion of the pre-selected music file 310, thus informing a user to the incoming communication signal.

Throughout this disclosure the use of the term radio telephone is used to describe any device that incorporates the functionality of radio telephones, including devices such as personal digital assistants. Also, the music files described in this disclosure include any type of digital music files, such as files in the widely accepted MP3 format.

The present disclosure has further described the use of the audible alerts of the present invention in association with telephone calls to a radio telephone 100. However those skilled in the art will readily appreciate that the advantages of the present invention also apply to other types of received communications such as SMS text messages, multimedia messages, and voicemail.

In summary the present invention is a system and method for playing an audible alert on a radio telephone 100. The audible alert is definable by a user and includes pre-selected portions of music files that are stored on the phone 100. The method and system is memory efficient and convenient for users because it enables dual use of stored music files, both for listening pleasure and for ring tones. The present invention further enables creative selection and concatenation of multiple portions of music files, which allows users to better identify callers and provides for more entertaining ring tones.

The above detailed description provides a preferred exemplary embodiment only, and is not intended to limit the scope, applicability, or configuration of the present invention. Rather, the detailed description of the preferred exemplary embodiment provides those skilled in the art with an enabling description for implementing the preferred exemplary embodiment of the invention. It should be understood that various changes can be made in the function and arrangement of elements and steps without departing from the spirit and scope of the invention as set forth in the appended claims.

I claim:

1. A method of playing an audible alert on a radio telephone, the method comprising the steps of:
    receiving an incoming communication signal for communicating with a user of the radio telephone;
    identifying at least one pre-selected music file, the music file being pre-selected by the user from a plurality of music files stored on the telephone to provide the audible alert in response to the receiving; and
    playing the audible alert comprising a pre-defined portion of the pre-selected music the thereby informing the user to the incoming communication signal, the portion off the music file being defined by a first stop point in the music file, the first stop point being determined by a user of the telephone selecting a stop time relative to an end point of the music file.

2. The method of claim 1, wherein the end point is at the beginning of the music file.

3. The method of claim 1, wherein the music file is further defined by a first start point that is identified by the user selecting a start time relative to the end point of the music file.

4. The method of claim 1, wherein the audible alert is defined by a music file location on the radio telephone, a ring tone name, the first start point, and the first stop point.

5. The method of claim 1, wherein the audible alert includes a second portion of the pre-selected music file, the second portion of the music file being pre-defined by a start point and a second stop point, such that the first and second portions of the music file are concatenated to make the audible alert.

6. The method of claim 1, wherein the audible alert further includes a portion of a second music file, the portion of the second music file being pre-defined by a second stop point, such that the portion of the at least one pre-selected music file and the portion of the second music file are concatenated to make the audible alert.

7. The method of claim 1, wherein the entire at least one pre-selected music file is playable on the telephone as music for listening pleasure.

8. The method of claim 1, wherein the step of identifying the at least one pre-selected music file associates the pre-defined portion of the music file with a sender of the incoming communication signal.

9. A radio telephone system capable of playing a user selected audible alert, the telephone system comprising:
- a radio frequency communications unit;
- a memory;
- a speaker; and
- a micro-processor operatively connected to the communications unit, the memory and the speaker;
- wherein the memory includes at least one pre-selected music file, the telephone adapted to:
- receive an incoming communication signal for communicating with a user of the radio telephone;
- identify the at least one pre-selected music file, the music file being pre-selected by the user from a plurality of music files stored on the telephone to provide the audible alert in response to the received signal; and
- play over the speaker the audible alert comprising a pre-defined portion of the pre-selected music file thereby informing the user to the incoming communication signal, the portion of the music file being defined by a first stop point in the music file, the first stop point being determined by a user of the telephone selecting a stop time relative to an endpoint of the music file.

10. The telephone system of claim 9, wherein the end point is at the beginning of the music file.

11. The telephone system of claim 9, wherein the music file is further defined by a first start point that is identified by the user selecting a start time relative to the end point of the music file.

12. The telephone system of claim 9, wherein the audible alert is defined by a music file location on the radio telephone, a ring tone name, the first start point, and the first stop point.

13. The telephone system of claim 9, wherein the audible alert includes a second portion of the pre-selected music file, the second portion of the music file being pre-defined by a start point and a second stop point, such that the first and second portions of the music file are concatenated to make the audible alert.

14. The telephone system of claim 9, wherein the audible alert further includes a portion of a second music file, the portion of the second music file being pre-defined by a second stop point, such that the portion of the at least one pre-selected music file and the portion of the second music file are concatenated to make the audible alert.

15. The telephone system of claim 9, wherein the entire at least one pre-selected music file is playable on the telephone as music for listening pleasure.

16. The telephone system of claim 9, wherein the pre-defined portion of the music file is associated with a sender of the incoming communication signal.

* * * * *